United States Patent [19]

Jaisle et al.

[11] Patent Number: 4,473,613
[45] Date of Patent: Sep. 25, 1984

[54] DECORATIVE LAMINATE

[75] Inventors: Richard F. Jaisle, Batesville, Ind.; Terrence P. Drees, Ft. Wright, Ky.

[73] Assignee: Formica Corp., Cincinnati, Ohio

[21] Appl. No.: 475,578

[22] Filed: Mar. 15, 1983

[51] Int. Cl.³ .................. B32B 27/10; B32B 27/42; B32B 31/20
[52] U.S. Cl. .................. 428/220; 156/307.1; 156/307.4; 428/503; 428/511; 428/525; 428/526; 428/530; 428/531; 428/537.1
[58] Field of Search ............. 428/530, 525, 526, 511, 428/503, 531, 220, 201, 204, 207, 211, 537; 156/307.1, 307.4

[56] References Cited

U.S. PATENT DOCUMENTS

| | | | |
|---|---|---|---|
| 3,218,225 | 11/1965 | Petropoulos | 428/503 |
| 3,220,916 | 11/1965 | Petropoulos | 525/119 X |
| 3,589,974 | 6/1971 | Albrinck et al. | 428/296 X |
| 3,798,117 | 3/1974 | Guertin et al. | 428/147 |
| 3,975,572 | 8/1976 | Power | 428/503 X |
| 3,983,907 | 10/1976 | Sorensen | 137/223 |
| 4,337,291 | 6/1982 | Kelly | 428/530 X |

*Primary Examiner*—Thomas J. Herbert
*Attorney, Agent, or Firm*—Frank M. Van Riet

[57] ABSTRACT

A decorative laminate comprising a core of at least one sheet of saturating kraft paper impregnated with a blend of a phenol/formaldehyde resin and a cross-linked, acrylic copolymer and optionally, a melamine/formaldehyde resin, and a decor sheet impregnated with (1) a first blend of a melamine/formaldehyde resin and a cross-linked, acrylic copolymer and (2) a second blend of a melamine/formaldehyde resin and an abrasive material, and a method for the production thereof, are disclosed.

12 Claims, No Drawings

DECORATIVE LAMINATE

BACKGROUND OF THE INVENTION

Conventional high pressure decorative laminates are produced by heat and pressure consolidating a laminate assembly comprising, in superimposed relationship, a plurality (e.g. 3-9) of phenol/formaldehyde resin impregnated saturating kraft paper sheets, a melamine/formaldehyde resin impregnated decor sheet and, optionally, a melamine/formaldehyde resin impregnated overlay sheet in a multi-opening press at from about 120°-250° C. and 6.9 MPa-11.0 MPa. The laminate assemblies are pressed, in back-to-back relationship, with the aid of release sheets and press plates, such that from about 8-35 laminates can be produced from each press opening during each press cycle.

These conventional laminates are employed, after being sanded and cut to size, as decorative surfaces for desktops, tabletops, wall panels and the like by adhering them to a substrate such as particleboard with conventional adhesives such as contact cement or rigid setting urea adhesives. The thickness of these laminates runs from about 0.5-10 mm or more and they may be formulated in such a manner so as to render them post-formable by the application of heat.

While the conventional high pressure laminates have undoubtedly achieved a phenominal success over the past 40 years, the need still exists for laminates having the properties of these conventional laminates but of thinner, more flexible, less costly nature and producible utilizing lower pressures during lamination.

Prior art procedures such as those taught in U.S. Pat. Nos. 3,220,916; 3,218,225; and 3,589,974 disclose the use of standard phenolic resins only to impregnate the kraft core sheets in the production of high pressure decorative laminates. No mention is made therein of the use of phenolic resin impregnated kraft sheets at low pressure i.e. below 5.5 MPa nor is there any disclosure of the use of an acrylic resin in conjunction with the phenolic resin to obtain laminates that can be prepared by low pressure consolidation i.e. under 5.5 MPa with properties comparable to laminates approximately twice the thickness and consolidated at pressure in excess of 6.9 MPa.

U.S. Pat. No. 3,798,117 sets forth an unsuccessful attempt to treat standard saturating kraft with an acrylic resin and produce satisfactory laminates therefrom while U.S. Pat. Nos. 3,983,907 and 3,975,572 disclose the use of wet strength paper impregnated with a mixture of melamine/formaldehyde and acrylic resins but fail to disclose the presence of any phenolic resin, even though high pressure is employed to consolidate the laminate.

It can therefore be seen that the prior art fails to teach the impregnation of standard kraft paper with an acrylic modified phenolic resin, optionally, containing a melamine/formaldehyde resin, nor does it teach the manufacture of low pressure laminate therefrom.

With regard to the decor sheet of the instant laminates, U.S. Pat. Nos. 3,220,916; 3,218,225; 3,798,117; 3,545,769; 3,983,907 and 3,975,572 teach the use of melamine/formaldehyde resin-acrylic resin mixtures to impregnate decor sheets preparatory to the formation of laminates therefrom. The impregnated decor sheets, after being oven dried, are further treated by passing them through a fully alkoxymethylated melamine mix to provide a top coat.

It has been found, however, that melamine/formaldehyde resins, when combined with acrylic emulsions and used to treat decor sheets to resin levels high enough to provide surface protection in the resultant laminate, result in hazy surfaces. Even at resin levels as low as 35%, there exists a tendency to whiten or haze the laminate surface.

The prior art therefore fails to teach a two-resin system, as employed in producing the laminates of this invention, so as to obtain a clear surface appearance and flexibility at low pressure while avoiding the use of alkoxymethylated melamine resins.

SUMMARY OF THE INVENTION

Flexible laminates can now be produced at pressures below 5.5 MPa in accordance with the present invention. These laminates contain 1 or more kraft core sheets, an optional reinforcing material of randomly oriented continuous fiber and a decor sheet positioned thereon. The decor sheet is impregnated with two separate resin formulations comprising a first blend of a melamine/formaldehyde resin and an acrylic resin and a second blend of melamine/formaldehyde resin and an abrasive material while the core sheets are impregnated with a single resin blend of a phenol/formaldehyde resin and an acrylic resin which may optionally contain a melamine/formaldehyde resin. The laminates of this invention are preferably thin, can be produced continuously, and possess the flexibility characteristics of thermoplastic laminates while maintaining the excellent surface properties exhibited by high pressure decorative laminates made from only thermoset resins. The unique treatment of the decor sheet with two resin blends overcomes the whitening of the laminate surface exhibited by previous laminates and generally caused by incompatability and/or refractive index differences of the melamine resin and the acrylic resin impregnated therein.

The unique aspects of the present invention reside in the use of a water-soluble phenolic resin modified with an acrylic resin or optionally, a melamine/formaldehyde resin-acrylic resin blend, as the impregnant of the core sheets and the dual treatment of the decor sheet to obviate whitening and produce at low pressure, laminates having surface properties substantially equivalent to conventional high pressure decorative laminates.

DESCRIPTION OF THE INVENTION INCLUDING PREFERRED EMBODIMENTS

The present invention is directed to a novel heat and pressure consolidated laminate, preferably of from about 0.2 to 0.8 mm in thickness, consisting essentially of:

1. 1 or more saturating kraft paper core sheets impregnated with a thermoset blend of (I) a phenol/formaldehyde resin, (II) a cross-linked acrylic resin and (III) an optional melamine/formaldehyde resin,
2. a decor sheet impregnated with (A) a thermoset first application of a blend of (IV) a melamine/formaldehyde resin and (V) a cross-linked acrylic resin and (B) a thermoset second application of a blend of (VI) a melamine/formaldehyde resin, and (VII) abrasive particles, and
3. an optional reinforcing member.

The phenol/formaldehyde resins used in the kraft paper core sheet or sheets of the instant laminates are those conventionally employed in the production of high pressure decorative laminates as disclosed and described in the above-mentioned U.S. patents. Generally, these resins are comprised of the reaction product of phenol and formaldehyde at a mole ratio of about 1:1 to about 1:2.5, respectively. They are liquid, water-soluble resins of the resole type and are present in the blend in amounts ranging from about 10% to about 80%, by weight, based on the total weight of the resin solids in the blend.

The cross-linking acrylic resin is employed in the blend in amounts ranging from about 15% to about 40%, by weight, based on the total resin solids in the blend and is produced in accordance with known acrylic copolymerization procedures i.e. solution polymerization, bulk polymerization, emulsion polymerization etc. utilizing any suitable catalyst such as a free-radical generating material. It is preferably produced as an aqueous emulsion and is cross-linkable, such as by virtue of containing various polar groups in the polymer chain incorporated therein via the addition of a third monomer containing the reactive polar group or by the addition of a cross-linking agent, such as an aminoplast resin etc. Cross-linking sites should be present in the copolymer in amounts ranging from about 10 to about 25%, by weight, based on the weight of the polymer per se.

These acrylic polymers are well known in the art and any such polymers conforming to the above requirements can be used herein. Preferred acrylic resins are those sold by Rohm and Haas Company and identified as Rhoplex®HA-12 and TR-934. The products are aqueous emulsions of an acrylic resin e.g. a copolymer of ethyl acrylate and methyl methacrylate. HA-12 is self cross-linking and is characterized by its ease of formation and resistance to discoloration upon exposure to ultraviolet light and aging. The emulsion is a milky-white liquid of the non-ionic type having a pH of 3.0, a density at 25° C. of 1054 kg/m$^3$, a specific gravity at 25° C. of 1.05, a Brookfield LVF Viscosity of 0.55N sec/m$^2$ (#3 spindle, 60 rpm) and a T$_{300}$ of +17° C., T$_{300}$ being defined as the temperature at which the torsional modulus of an air-dried film is 300 kg/cm$^2$, a relative indication of film stiffness. TR-934 is also a self cross-linking, milky-white liquid characterized by its superior heat and light stability, silvent resistance and flow temperature flexibility. It is an anionic type material having a pH of 8.5, a density at 25° C. of 1042 kg/m$^3$, a specific gravity at 25° C. of 1.04, a Brookfield LVF viscosity at 25° C. of 0.05N sec/m$^2$ (#2 spindle, 60 rpm), excellent mechanical stability and a T$_{300}$ of −30° C. Other commercially available cross-linking acrylic resin emulsions such as Hycar®2600X138 and Hycar®26171 sold by B. F. Goodrich may also be used.

The melamine/formaldehyde resin which forms the optional third component of the resin blend impregnated into the kraft core sheet or sheets is a water-soluble resin having a mole ratio of melamine to formaldehyde of from about 1:1 to about 1:3, respectively, and is prepared in accordance with known procedures such as those disclosed in the above-mentioned U.S. patents. The melamine/formaldehyde resins are employed in the blends used to impregnate the kraft sheet or sheets in amounts ranging from about 0% to about 75%, by weight, based on the resin solids in the blend and may contain small amounts of other triazines such as acetoguanamine etc.

The saturating kraft paper sheets are those generally employed in the preparation of high pressure decorative laminates and have a basis weight ranging from about 120–180 g/m$^2$. The above-described resin blend is impregnated into the kraft sheet or sheets utilizing a dip and squeeze treater or other known impregnating apparatus such as dip and scrape, reverse roll etc. from an aqueous solution of the components, the acrylic resin preferably being present therein as an aqueous emulsion. The resin blend is impregnated into the kraft sheet or sheets in an amount ranging from about 35–55%, preferably 40–50%, based on the weight of the paper, with a volatile content of from about 5–10%, or less.

Various additives are preferably added to the aqueous blend with which the kraft paper sheet or sheets are impregnated in order to assure optimum results. For example, urea can be present in an amount ranging from about 0.25–1.50%, based on the total weight of the solution, for the purpose of stabilizing the mixture. Release agents, defoamers, and catalyst blocking agents can also be added. Acid catalysts, or other cross-linker agents, used to assure complete curing and cross-linking of the resins during lamination may also preferably be added. Such materials as oxalic acid, diammonium hydrogen phosphate, ammonium nitrate, sulfuric acid, citric acid, p-toluene sulfonic acid, hexakismethoxymethyl melamine and the like, in amounts ranging from about 0.5 to 10.0%, based on the weight of the mixture, may be included to increase effectiveness. After impregnation, the kraft sheet or sheets can be dried and stored under low humidity conditions or used as such upon removal from the impregnation bath.

The decor sheet is also that generally employed in the production of conventional high or low pressure laminates. The sheet can be a printed paper, a pigmented paper etc. and generally should have a basis weight ranging from about 16–160 g/m$^2$, preferably 30 g/m$^2$–145 g/m$^2$.

The decor sheet is impregnated with a blend of a melamine/formaldehyde resin, as described above, and a cross-linkable acrylic resin, also as described above. The amount of melamine/formaldehyde resin to acrylic resin ranges from about 50:90 to about 50:10, respectively, preferably about 50:50.

The impregnation of the decor sheet is accomplished in two stages, the first stage comprising coating the sheet with an aqueous solution of melamine/formaldehyde resin and acrylic resin to a resin content of from about 10–30%, solids, preferably 15–25% solids. The blend is preferably applied to the backside of the decor sheet so that no strike-through of the resin blend to the surface of the paper occurs.

The second application of resin to the decor sheet is conducted either after drying the sheet after the first application or, preferably, in-line with and immediately after said first application of resin, preferably with intermediate drying. The melamine/formaldehyde resin of the second application can be the same or different than that used in the first application, the materials useful therefor being described above. The decor sheet is impregnated in the second application to a resin content of 25–50%, preferably 30–45%, to produce a total resin content resulting from the two applications of 55–60% and a volatile content of 5–8%.

As with the phenolic resin system, various additives may be added to the decor sheet first and/or second application blends in order to optimize their impregnation or other properties. Such materials as catalyst blocking agents, wetting agents, thickeners and dispersing agents fall within the category of useful additives. As mentioned above, abrasive particles are included in the second application blend, and therefore, the use of a thickener is preferred to hold the particles in suspension in the aqueous solution of resin. Sufficient abrasive particles of such materials as aluminum oxide, barium sulfate, cerium oxide, silicon carbide, silica etc. should be employed so as to achieve the desired abrasion resistance on the laminate surface produced therefrom. Generally, amounts of abrasive ranging from about 0.25 to about 1.0%, are sufficient. The particle size of the abrasive should range from about 5 to about 40 microns.

Catalysts may also be added to either or both of the resin solutions with which the decor sheet is treated in order to achieve maximum cure of the resins in the minimum amount of time. Suitable catalysts, in amounts ranging from about 0.25 to about 5%, by weight, based on the solids content of the system, include formic acid, magnesium bromide, p-toluene, sulfonic acid and the like.

In the impregnation of the core sheet or sheets and the decor sheet, the melamine/formaldehyde resin and the acrylic resin can be the same or different for each laminate component.

The impregnation of both the decor sheet and the kraft core sheet or sheets is preferably conducted continuously from rolls of these papers. Upon passing through the impregnation baths, the sheets are preferably dried in a suitable hot air drying oven and rewound into rolls useful as feeds to the heat and pressure consolidation stage of the laminate production.

When the laminates are produced in a continuous manner, the decor and core sheets, impregnated as described above, optionally, in conjunction with a reinforcing material as described below, are preferably fed continuously in correct juxtaposition between heated belts of a double-belt press. A conventional high pressure laminating texturizing release sheet may be interposed between the decor sheet and the belt. The release sheet may be rolled and re-used upon exiting the press. When no release sheet is used, the belt can be pre-treated with a suitable release agent. Pressure is exerted against the back of the belts and through them to the sheets being laminated. The sheets are held and transported by the belts while being heated to a temperature ranging from about 120°-250° C. and pressure consolidated at a pressure under about 5.5 MPa. Means of exerting pressure in the belt press is hydraulic, seals being used to contain the pressure medium, usually air. Alternatively, the laminates can be heat and pressure consolidated in a batch process utilizing conventional laminating presses operating at pressures below 5.5 MPa. Upon exiting the press, the consolidated laminate is separated from the release paper, if used, and passed over cooling rolls to a sanding station where the back side is lightly sanded. From the sander, the laminate is edge trimmed and readied for shipment to the consumer.

As mentioned above, during the laminate production, a reinforcing member may be positioned between the decor sheet and the backmost kraft paper sheet in order to toughen the ultimate laminate produced. The reinforcing member is preferably manufactured of randomly oriented fibers and is preferable positioned immediately below the decor sheet. It provides tear-resistance by inhibiting self propagation of any notch, edge crack or tear that may occur during normal handling or machining of the laminate. When the reinforcing member is used, it requires no change in the resin treatment of the other laminate components or the laminating press cycle. The reinforcing member, usually employed in the form of a gossamer veil does not require resin impregnation before use. Because of its light weight, it does not contribute any material thickness to the laminate nor does it alter the surface appearance or properties thereof. A preferred reinforcing member is a veil of spunbonded polyester fiber having a thickness of 0.05-0.1 mm, a weight of 5-20 g/m$^2$ and sold by E. I. DuPont de Nemours & Co. under the name Reemay ®. Other useful materials include veils or webs of the above thickness and weight made from glass fiber, thermoplastic filaments etc. or papers made of parchmentized cellulose, vulcanized fiber and the like.

The following examples are set forth for purposes of illustration only and are not to be construed as limitations on the present invention except as set forth in the appended claims. All parts and percentages are by weight unless otherwise specified.

EXAMPLE I

A roll of printed, saturating, α-cellulose containing decor paper having a basis weight of 80 g/m$^2$ is fed through a resin treater and Resin Formulation A, set forth below, is applied to the back side thereof, via a roll system, to a resin content of about 25%. The melamine/formaldehyde component of the resin mixture has a melamine to formaldehyde ratio of 1:1.36 and a melamine plus acetoquanamine to formaldehyde ratio of 1:1.15. The acrylic resin is a commercially available acrylic emulsion of the non-ionic, self-crosslinking type produced primarily from ethyl acrylate and methyl methacrylate. (Rohm & Haas, Rhoplex ® HA-12).

| Resin Formulation A - Decor Sheet - 1st Pass | |
|---|---|
| Component | % by weight |
| 49.5% solids aq. solution of melamine resin | 50 |
| 45.0% solids aq. emulsion of acrylic resin | 50 |

The coated decor sheet resulting from said first pass is then fed to a dip and squeeze treatment apparatus where Resin Formulation B is applied to a resin content of 32%. The melamine resin is the same as that in the first formulation above. The total resin content of the decor sheet is therefore 57%. The volatile content, after drying in an oven, in the resultant double impregnated roll is about 7%.

| Resin Formulation B - Decor Sheet - 2nd Pass | |
|---|---|
| Component | % by weight |
| 49.5% solids aq. solution of melamine resin | 95.46 |
| Thickener (Carboxymethyl cellulose) | .24 |
| Mold release agent | .05 |
| Dispersing Agent (glycerine) | 1.43 |
| Surfactant | .19 |
| Aluminum Oxide Particles - 9 micron | .72 |
| Catalyst (para-toluene sulfonic acid plus blocking agent) | 1.91 |

A roll of saturating kraft paper having a basis weight of 150 g/m² is impregnated with Resin Formulation C, set forth below, to a resin content of 47% utilizing a dip and squeeze treater. After drying the volatile content is 9%. The phenolic resin employed has a phenol to formaldehyde ratio of 1:1.75, the melamine/formaldehyde resin has a melamine to formaldehyde ratio of 1:2 and the acrylic resin is the same as used above for impregnating the decor sheet.

| Resin Formulation C - Kraft Sheet | |
|---|---|
| Component | % by weight |
| 67% solids aq. solution of phenolic resin | 45.69 |
| Water | 11.42 |
| 50% solids aq. solution of melamine resin | 19.04 |
| 45% solids aq. emulsion of acrylic resin | 19.04 |
| Mold release agent | .95 |
| Defoamer | .05 |
| Catalyst (para-toluene sulfonic acid plus blocking agent) | 3.81 |

The above impregnated roll of decor paper is slightly unrolled and the unrolled area is placed atop a slightly unrolled area of the above impregnated kraft paper. The two rolls are fed in such superimposed relationship between the belts of a double belt press. The speed of the juxtapositioned sheets through the press is 5 m/minute, or 24 seconds under pressure.

The belt temperatures are 180° C. and the pressure applied is 1.38 MPa. The laminate recovered from the continuous press is lightly sanded on its back side and edge trimmed. The properties of the resultant laminate are determined and compared to those of a conventional high pressure decorative laminate using the test methods of International Standard ISO-4586/2-1981. The results are set forth in Table I, below. Additionally, various non-ISO test results are set forth in Table IA, below.

EXAMPLE II

The procedure of Example I is followed except that total resin content of the decor sheet is 58% and the volatile content is 8% after impregnation with Resin Formulations A and B of Example I and that the resin formulation for the kraft sheet is as set forth below. Resin content of the kraft sheet is 50% and volatile content is 8.6%. The phenolic resin and the melamine resin are the same as for Resin Formulation C of Example I and the acrylic resin is a commercially available acrylic emulsion of the anionic, self-crosslinking type (Rhoplex® TR 934—Rohm & Haas).

| Resin Formulation D - Kraft Sheet | |
|---|---|
| Component | % by weight |
| 67% solids aq. solution of phenolic resin | 48.01 |
| Water | 7.20 |
| 50% solids aq. solution of melamine resin | 19.97 |
| 44.5% solids aq. emulsion of acrylic resin | 19.97 |
| Mold release agent | .96 |
| Defoamer | .05 |
| Catalyst (para-toluene sulfonic acid plus blocking agent) | 3.84 |

Laminates are produced in a double belt press for 20 seconds at 180° C. and 1.38 MPa. The properties of the resultant laminate are set forth in Table I below. Formulation D is more stable than Formulation C and therefore more suitable for high volume operations.

EXAMPLE III

A roll of printed, saturating, α-cellulose containing decor paper having a basis weight of 80 g/m² is coated via a roll system on its unprinted side with Resin Formulation E, set forth below, to a resin content of 17%. The melamine resin component is the same as that in Formulation A of Example I and the acrylic resin is the same as that in Formulation D of Example II.

| Resin Formulation E - Decor Sheet - 1st Pass | |
|---|---|
| Component | % by weight |
| 49.5% solids aq. solution of melamine resin | 49.4 |
| 44.5% solids aq. emulsion of acrylic resin | 49.4 |
| Catalyst (para-toluene sulfonic acid plus blocking agent) | 1.2 |

The coated decor sheet resulting from the above described first pass, after drying, is then fed to a dip and squeeze treatment where Resin Formulation F is applied to a total resin content of 60% and a volatile content after drying of 8.2%. The Resin Formulation F is reduced in viscosity from that of Example I and is as follows:

| Resin Formulation F - Decor Sheet - 2nd Pass | |
|---|---|
| Component | % by weight |
| 49.5% solids aq. solution of melamine resin | 95.78 |
| Thickener (Carboxy methyl cellulose) | .4 |
| Mold release agent | .05 |
| Dispersing agent (glycerine) | 1.44 |
| Surfactant | .9 |
| Aluminum Oxide Particles - 9 micron | .48 |
| Catalyst (para-toluene sulfonic acid plus (blocking agent) | .92 |

A roll of saturating kraft paper having the same basis weight as that of Example I is impregnated with Resin Formulation D, as used in Example II, to a total resin content of 49% and a volatile content of 9.5%. The treated decor sheet and treated core sheet are fed into a double band press in the same manner as in Example II. The properties of the resultant laminate are also set forth in Tables I and IA, below.

TABLE I

| Property-ISO-4586/2 | Units | Requirements: High Pressure Vertical Post-Forming Laminate ISO-4586/1-1981 | Properties of Laminate of Example I | Properties of Laminate of Example II | Properties of Laminate of Example III |
|---|---|---|---|---|---|
| Thickness | mm | Not specified | .37 | .385 | .375 |
| Resistance to Surface Wear[1]* | Revs. | 150 min. | 305 | 140 | 226 |
| Resistance to Impact, Spring Force[2]* | N | 15 min. | 25 | 16 | 10 |
| Resistance to Cracking | Grade | 1 | 1 | 0 | |
| Resistance to Scratching[3]* | N | 1.75 min. | 3.2 | 2.6 | |
| Resistance ot Stains[4]* | | A | A | | |
| Resistance to Color Change in Xenon Arc | Wool Std. | 6 min. | >6 | >6 | |
| Resistance to Cigarette[6]* Burns | Seconds | Not specified | 110 | 105 | |
| Formability[7]* | mm of radius | 13 max. | 2 | 3 | 6.4 |
| Resistance ot Dry Heat[8]* | | Not specified | NE | NE | Blister |
| Resistance to Boiling Water[9]* | | | | | |
| Mass Gain | % | 20 Max. | 11.1 | 12.0 | 12.9 |
| Thickness Gain | % | 25 Max. | 9.6 | 7.8 | |
| Appearance | | B | Blisters | Blisters | |
| Dimensional Stability at Elevated Temperature[10]* | | | | | |
| Length | % | .7 Max. | .39 | .26 | |
| Transverse | % | 1.2 Max. | .97 | 1.03 | |

A — No Blistering or discoloration
B — No deterioration
NE — No effect
*[1]Clause 6
*[2]Clause 11
*[3]Clause 14
*[4]Clause 15
*[5]Clause 16
*[6]Clause 19
*[7]Clause 20
*[8]Clause 8
*[9]Clause 7
*[10]Clause 9

TABLE IA

| Property | Units | Laminate of Example I | Laminate of Example II | Laminate of Example III |
|---|---|---|---|---|
| Density | g/cm$^3$ | 1.405 | 1.304 | 1.297 |
| Steam | | Whitens | Slight Whitening | Very Slight Whitening |
| Stress Crack | hr. | 3 | 1.9 | |
| Tea Pot | | No effect | No effect | No effect |
| Radius-cold min. | mm | 25.4* | 12.7* | 22.2* |
| Impact Resistance | mm | 1549 | 1498 | 599 |
| Tear | mN | | | |
| L | | 220 | 175 | 230 |
| C | | 150 | 165 | 180 |
| Internal Bond | MPa | 416** | 2.15** | |
| Flatness | mm | | | |
| Out of Press | | <100 | <100 | <100 |
| Initial | | <100 | Flat | Flat |

*Mandrel
**2.54 cm sq. sample

EXAMPLE IV

A roll of printed decor paper, basis weight 80 g/m² is fed through a resin treater and Resin Formulation G is applied. The melamine resin component has a melamine to formaldehyde ratio of 1:1.6 and the acrylic resin is the same as for Example I.

| Resin Formulation G - Decor Sheet - 1st Pass | |
|---|---|
| Component | % by weight |
| 50% solids aq. solution melamine resin | 50 |
| 45% solids aq. emulsion of acrylic resin | 50 |

The coated decor sheet from this first pass is then fed to a dip and squeeze treatment where Resin Formulation H is applied to a total resin content of 58% and 6% volatile after drying. Resin Formulation H is set forth below and has the same melamine resin component as Resin Formulation G.

| Resin Formulation H - Decor Sheet - 2nd Pass | |
|---|---|
| Component | % by weight |
| 50% solids aq. solution of melamine resin | 96.2 |
| Thickener (Carboxy Methyl Cellulose) | .3 |
| 40% solids solution of catalyst (p-toluene sulfonic acid) | 2.0 |
| Catalyst Blocking Agent (Triethanolamine) | .5 |
| Surfactant | .5 |
| Aluminum Oxide Particles - 9 micron | .5 |

A roll of saturating kraft, 150 g/m² basis weight, is impregnated with Resin Formulation K set forth below to a resin content of 40% and volatile content of about 7%. The phenolic resin used is the same as in Example I and the melamine and acrylic resin are the same as used above in this example for impregnating the decor sheet.

| Resin Formulation K - Kraft Sheet | |
|---|---|
| Component | % by weight |
| 67% solids aq. solution of phenolic resin | 45.8 |
| Water | 10.9 |
| Urea | .6 |
| 50% solids aq. solution of melamine resin | 19.1 |
| 45% solids aq. emulsion of acrylic resin | 19.1 |
| 40% solids aq. catalyst (p-toluene sulfonic acid) | 4.0 |
| Mold Release Agent | .5 |

The impregnated decor paper is placed atop the impregnated kraft paper and assembled in such superimposed relationship with stainless steel plates and placed between the hot platen of a multi-opening press. The platens are at a temperature of 170° C. A pressure of 1.38 MPa is applied and released after 30 seconds. The assembly is removed from between the hot platens and the cured laminate recovered and allowed to cool. The properties of this laminate are shown in Table II, below.

lations set forth below to a resin content of 40% and a volatile content of 6.5%. The phenolic, melamine and acrylic resin components are the same as those set forth in Example IV.

| Component | Example V Formulation L % by weight | Example VI Formulation M % by weight |
|---|---|---|
| 67% solids aq. solution of phenolic resin | 55.0 | 22.5 |
| 50% solids aq. solution of melamine resin | — | 22.5 |
| 45% solids aq. emulsion of acrylic resin | 20.0 | 20.0 |
| Water | 25.0 | 25.0 |

The impregnated papers are assembled as in Example IV and heat and pressure consolidated in a multi-opening press for 60 seconds at 170° C. and 1.72 MPa. The laminate is recovered and allowed to cool. The properties of the resultant laminates are set forth in Table II, below.

TABLE II

| Property-N-NEMA LD3-1980 | Units | NEMA Post-Forming Grade Standards | Properties of Laminate of Example IV | Laminate of Example V | Laminate of Example VI |
|---|---|---|---|---|---|
| Thickness | mm | .76 | .43 | — | — |
| Water Resistance[1] | Revs | 300 min. | 140 | 97 | 97 |
| High Temp Resistance[2] (Resistance to Dry Heat) | | SL | SL | NE | NE |
| Boiling Water resistance[3] | | NE | NE | NE | NE |
| Boiling Water - Mass Gain | % | NS | 20.8 | 2.0 | 3.0 |
| Boiling Water - Thick Gain | % | NS | 17.8 | 3.5 | 6.0 |
| Radiant Heat[4] | Sec | 80 min. | 163 | ND | ND |
| Impact Resistance[5] | mm | 508 min. | 143 | ND | ND |
| Fade Resistance[6] | | SL | NE | ND | ND |
| Dimensional Change[7] - Length | % | 1.1 max. | .19 | ND | ND |
| Cross | % | 1.4 max. | .67 | ND | ND |
| Formability[8] - hot - 156° C. | mm | 12.7 min. | 3 | 3 | 3.2 |
| cold - 25° C. | mm | NS | 4 | 0.8 | 0.8 |

SL — Slight Effect (Loss of Gloss)
NE — No Effect
NS — Not Specified
ND — Not Determined
[1]LD3 — 3.01
[2]LD3 — 3.06
[3]LD3 — 3.05
[4]LD3 — 3.07
[5]LD3 — 3.03
[6]LD3 — 3.10
[7]LD3 — 3.04
[8]LD3 — 3.14

EXAMPLES V AND VI

The procedure of Example IV is again followed. The impregnated decor sheet of Example IV is used with kraft sheets that have been impregnated with the formu- Table III, below is a summary of the various resin formulations and laminating conditions utilized in Examples I-VI above.

TABLE III

| | Example I | Example II | Example III | Example IV | Example V | Example VI |
|---|---|---|---|---|---|---|
| Decor-1st Resin Formulation | A | A | E | G | G | G |
| M:F Ratio | 1:1.36 | 1:1.36 | 1:1.36 | 1:1.6 | 1:1.6 | 1:1.6 |
| M + Al:F Ratio | 1:1.15 | 1:1.15 | 1:1.15 | — | — | — |
| M:Ac Wt. Ratio | 1:1 | 1:1 | 1:1 | 1:1 | 1:1 | 1:1 |
| Catalyst - % | nil | nil | 1.2 | nil | nil | nil |
| Type of Ac | non-ionic | non-ionic | anionic | non-ionic | non-ionic | non-ionic |
| % Resin Content | 25 | 25 | 17 | 20 | 20 | 20 |
| Decor-2nd Resin Formulation | B | B | F | H | H | H |
| M:F ratio | 1:1.36 | 1:1.36 | 1:1.36 | 1:1.6 | 1:1.6 | 1:1.6 |
| M + Al:F Ratio | 1:1.15 | 1:1.15 | 1:1.15 | — | — | — |
| Abrasive - % | .72 | .72 | .48 | — | — | — |
| % Resin Content | 57 | 58 | 60 | 58 | 58 | 58 |
| % Volatile Content | 7 | 8 | 8 | 9 | — | — |
| Catalyst - % | 2.0 | 2.0 | 1.9 | 2.0 | 2.0 | 2.0 |
| Core - Resin Formulation | C | D | D | K | — | M |
| M:F Ratio | 1:2 | 1:2 | 1:2 | 1:1.6 | None | 1:1.6 |
| P:F Ratio | 1:1.75 | 1:1.75 | 1:1.75 | 1:1.75 | 1:1.75 | 1:1.75 |

TABLE III-continued

|  | Example I | Example II | Example III | Example IV | Example V | Example VI |
| --- | --- | --- | --- | --- | --- | --- |
| P:M:AcWt. Ratio | 53:23.5:23.5 | 54.5:22.75:22.75 | Same as Ex. II | 53:23.5:23.5 | 76.5:0:23.5 | 38.25;38.25:23.5 |
| Type of Ac | non-ionic | anionic | anionic | non-ionic | non-ionic | non-ionic |
| % Resin Content | 47 | 50 | 49 | 40 | 40 | 40 |
| % Volatile Content | 9 | 8.6 | 9.5 | ca 6-7 | 6.5 | 6.5 |
| Catalyst % | 3.8 | 3.8 | 3.8 | 4.0 | nil | nil |
| Cure Temperature - °C. | 180° | 180° | 180° | 170° | 170° | 170° |
| Cure Time - seconds | 24 | 20 | 20 | 30 | 60 | 60 |
| Pressure - MPa | 1.38 | 1.38 | 1.38 | 1.38 | 1.72 | 1.72 |

$A^1$ = Acetoguanamine
P = Phenol
M = Melamine
F = formaldehyde
Ac = acrylic resin

EXAMPLE VII

The procedure of Example I is again followed except that two (2) rolls of impregnated kraft paper are placed one on top of the other and fed into the continuous press instead of one (1). The resultant laminate is 0.5 mm thick and possesses properties similar to those set forth in Table I for the laminate of Example I.

EXAMPLE VIII-XI (Comparative)

The procedure of Example I is again followed except that the amount of the acrylic resin present in the resin formulation impregnated into the kraft core sheet is varied from 0% (Examples VIII and IV) to 9% (Examples X and XI). The kraft paper resin formulations and properties of the laminates are set forth in Table IV, below.

TABLE IV

|  | Laminate of Example VIII | Laminate of Example IX | Laminate of Example X | Laminate of Example XI |
| --- | --- | --- | --- | --- |
| Kraft paper $p^1/M^1/Ac^1$ Ratio | 50/50/0 | 50/50/0 | 45.5/45.5/9 | 45.5/45.5/9 |
| Decor Sheet Basis Wt. - g/m$^2$ | 80 | 105 | 105 | 80 |
| Thickness - mm | .34 | .37 | .38 | .32 |
| Abrasion$^1$ - cycles | 262 | 307 | 286 | 253 |
| Hot Pot$^2$ | SI | NE | NE | NE |
| Tea Pot$^3$ | SI | SI | SI | SI |
| Cigarette$^4$ seconds | 77 | 92 | 75 | 64 |
| Water Absorption - % | 13.2* | 11.5* | 10.6* | 10.7* |
| Thickness Swell - % | 19.1 | 32.3 | 19.5 | 19.7 |
| Impact$^5$ - mm | 1295 | 1321 | 1016 | 787 |
| Formability - mm |  |  |  |  |
| Cold | 16 | 12 | 14 | 14 |
| Hot$^6$ | 2.8 | 2.2 | 2.2 | 2.5 |
| Blister Time$^7$ - sec. | 13 | 11 | 11 | 11 |

*Print Blister Severe
$^1$Nema LD3-3.01
$^2$LD3-3.06
$^3$LD3-3.05
$^4$LD3-3.07
$^5$LD3-3.03
$^6$LD3-3.14
$^7$LD3-3.15
$p^1$ = Phenolic Resin
$M^1$ = Melamine Resin
$Ac^1$ = Acrylic Resin

EXAMPLE XII

The procedure of Example II is again followed except that (1) the first application of the resin formulation to the decor sheet results in an impregnation to about 13 percent and a total volatile content of 7.8%, (2) the resin concentration of the kraft sheet after impregnation is 49% and the volatile content is 9.0 and (3) a sheet of commercially available spun bonder polyester weighing 16 grams/square meter is placed between the kraft sheet and the decor sheet. The sheet assembly is heat and pressure consolidated at a pressure of 1.38 MPa at 6 meters/minute.

The resultant laminate has a Tear Strength in the Length direction of 320 mN and in the Transverse direction of 350 mN, a Density of 1.27 grams/cubic centimeter, a thickness of 0.46 mm and a Mass Gain of 13.7% and Thickness Gain of 14.4% (Resistance to Boiling Water).

We claim:

1. A heat and pressure consolidated decorative laminate of from about 0.2 to about 0.8 mm in thickness, consisting essentially of,
   (a) one or more kraft paper sheets impregnated with a thermoset blend of (I) a water-soluble phenol/-formaldehyde resin, (II) a self cross-linked acrylic resin and (III) a water-soluble melamine/formaldehyde resin,
   (b) a decor sheet atop said (a) impregnated with (A) a thermoset first application of a blend of (IV) a water-soluble melamine/formaldehyde resin and (V) a self cross-linked acrylic resin and (B) a thermoset second application of a blend of (VI) a water-soluble melamine/formaldehyde resin and (VII) abrasive particles and
   (c) optionally, below said (a) a reinforcing member.

2. The laminate of claim 1 wherein the same melamine/formaldehyde resin is used as components (III), (IV) and (VI).

3. The laminate of claim 1 wherein the same self cross-linked acrylic resin is used as components (II) and (V).

4. The laminate of claim 1 wherein the same melamine/formaldehyde resin is used as components (III), (IV) and (VI) and the same self cross-linked acrylic resin is used as components (II) and (V).

5. The laminate of claim 1 wherein said abrasive particles are aluminum oxide.

6. The laminate of claim 1 wherein said (II) crosslinked acrylic resin is a non-ionic, self crosslinked copolymer of ethyl acrylate and methyl methacrylate and said (V) crosslinked acrylic resin is an anionic self crosslinked acrylic resin.

7. A method for the production of a heat and pressure consolidated decorative laminate of from about 0.2 to about 0.8 mm in thickness, which comprises,
(i) impregnating 1 or more kraft sheets with a thermosetting blend of (I) a water-soluble phenol/formaldehyde resin, (II) an aqueous emulsion of a self cross-linkable acrylic resin and (III) a water-soluble melamine/formaldehyde resin and
(ii) impregnating a decor sheet firstly with (A) a thermosetting first blend of (IV) a water-soluble melamine/formaldehyde resin and (V) an aqueous emulsion of a self cross-linkable acrylic resin;
(iii) impregnating said decor sheet secondly with (B) a thermosetting second blend of (VI) a water-soluble melamine/formaldehyde resin and (VII) abrasive particles;
(iv) forming an assembly, of the resultant impregnated kraft sheet or sheets, and atop said kraft sheet or sheets, the resultant impregnated decor sheet and, optionally, below said kraft sheet or sheets, a reinforcing member; and
(v) heat and pressure consolidating the resultant assembly into a decorative laminate.

8. The method of claim 7 wherein said kraft sheet or sheets and said decor sheet are impregnated from a roll, the resultant impregnated sheets are dried and rerolled and the rerolled sheets are heat and pressure consolidated, optionally in conjunction with a reinforcing member, by feeding said rerolled sheets into a continuous press at a temperature ranging from about 120°–250° C. and at a pressure under about 5.5 MPa.

9. The method of claim 7 wherein said abrasive particles are aluminum oxide.

10. The method of claim 7 wherein the same melamine/formaldehyde resin is used as components (III), (IV) and (VI).

11. The method of claim 7 wherein the same aqueous emulsion is used as components (II) and (V).

12. The method of claim 7 wherein the aqueous emulsions used as components (II) and (V) are emulsions of different acrylic resins.

* * * * *